US006996466B2

(12) United States Patent
Bastian et al.

(10) Patent No.: US 6,996,466 B2
(45) Date of Patent: Feb. 7, 2006

(54) METHOD OF CONTROLLING VEHICLE HANDLING BY INFLUENCING THE YAW VELOCITY

(75) Inventors: Klaus Bastian, Neuhausen (DE); Jan Frank, Koeigsbach-Stein (DE); Markus Hofbauer, Rechberghausen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 82 days.

(21) Appl. No.: 10/670,746

(22) Filed: Sep. 26, 2003

(65) Prior Publication Data

US 2004/0129477 A1 Jul. 8, 2004

(30) Foreign Application Priority Data

Sep. 26, 2002 (DE) ........................................ 102 45 032

(51) Int. Cl.
*B60K 17/344* (2006.01)

(52) U.S. Cl. ......................................... 701/69; 180/248

(58) Field of Classification Search .................. 701/69, 701/36; 180/233, 248
See application file for complete search history.

(56) References Cited

U.S. PATENT DOCUMENTS

| | | | | |
|---|---|---|---|---|
| 5,225,984 A | * | 7/1993 | Nakayama | 701/36 |
| 5,262,950 A | * | 11/1993 | Nakayama | 701/36 |
| 5,301,768 A | | 4/1994 | Ishikawa et al. | |
| 5,417,298 A | | 5/1995 | Shibahata | |
| 5,450,919 A | | 9/1995 | Shitani | |
| 5,742,917 A | | 4/1998 | Matsuno | |
| 6,101,434 A | | 8/2000 | Irie et al. | |

FOREIGN PATENT DOCUMENTS

| | | |
|---|---|---|
| DE | 44 00 685 A1 | 7/1994 |
| DE | 195 23 354 A1 | 1/1996 |
| DE | 197 21 299 A1 | 12/1997 |
| DE | 198 30 561 C2 | 6/1999 |
| DE | 100 54 023 A1 | 5/2002 |
| EP | 1203687 A1 | 5/2002 |

* cited by examiner

*Primary Examiner*—Yonel Beaulieu
(74) *Attorney, Agent, or Firm*—Crowell & Moring LLP

(57) ABSTRACT

A method of controlling the handling of vehicles having a controllable longitudinal clutch and/or a controllable main-axle lateral lock in the case of all-wheel systems and a controllable lateral lock in the case of vehicles with a single-axle drive. The input quantities are first detected and processed, and subsequently, a comparison takes place of the desired driving direction, which is defined by way of the steering angle (LW), and the actual moving direction (BR) of the vehicle. If the two values deviate from one another by a definable reference value (RW), the coupling between the front axle and the rear axle of the vehicle is increased for increasing the yaw damping, or, when a controllable main-axle lateral lock is present, the locking torque of the lateral lock is increased, or the two measures are initiated simultaneously.

10 Claims, 1 Drawing Sheet

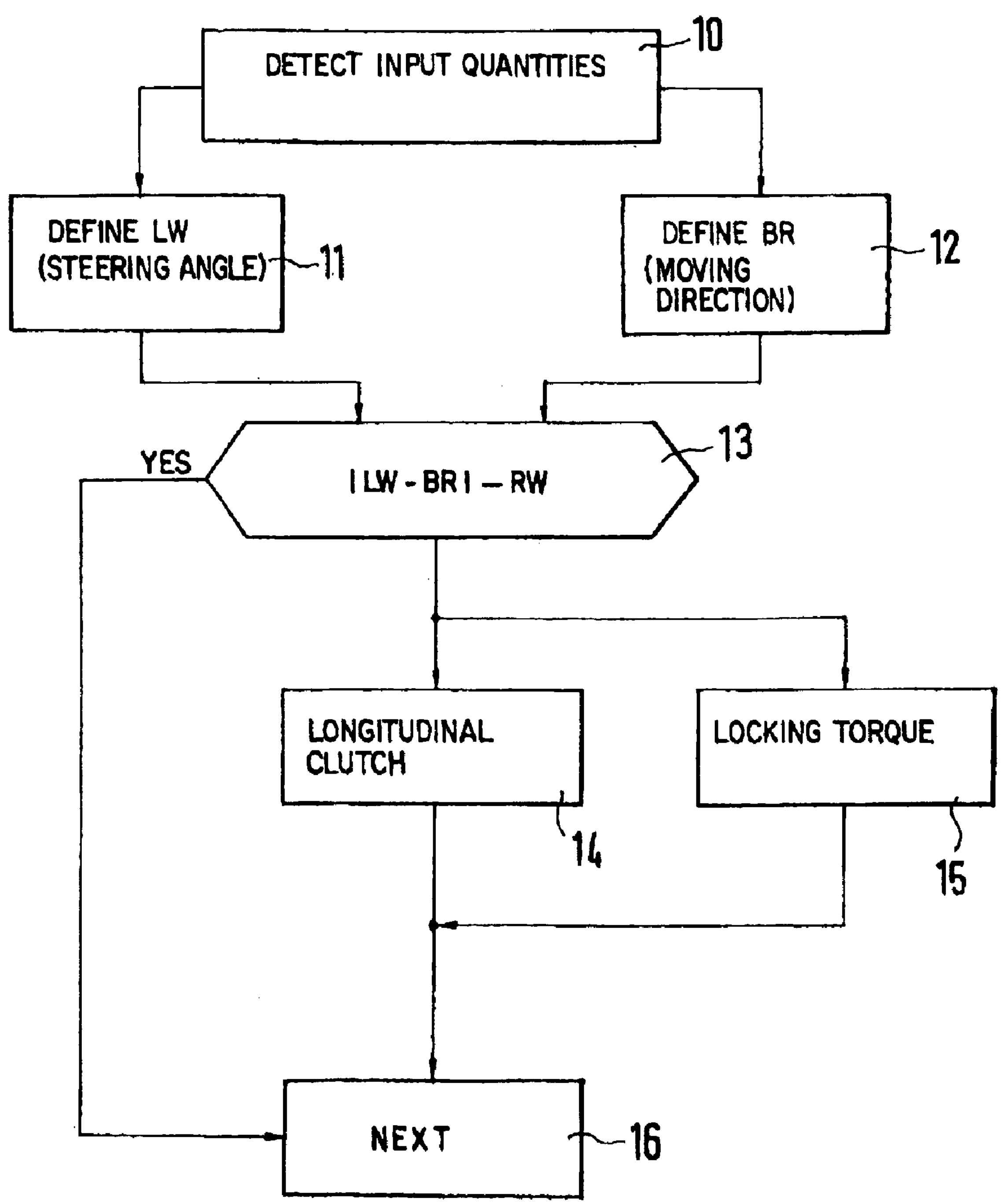
DETECT INPUT QUANTITIES
10
DEFINE LW (STEERING ANGLE)
11
DEFINE BR (MOVING DIRECTION)
12
YES
|LW - BR| — RW
13
LONGITUDINAL CLUTCH
14
LOCKING TORQUE
15
NEXT
16

METHOD OF CONTROLLING VEHICLE HANDLING BY INFLUENCING THE YAW VELOCITY

BACKGROUND AND SUMMARY OF THE INVENTION

This application claims the priority of Application No. 102 45 032.3, filed Sep. 26, 2002, in Germany, the disclosure of which is expressly incorporated by reference therein.

The present invention relates to vehicles with open transmission lines which, particularly when cornering, in the limit range at the change-over to an oversteering, reach high yaw velocities as well as high yaw accelerations. These yaw velocity or yaw accelerations require the driver to have a high degree of driving skill. For avoiding critical situations, these vehicles are often designed from the start to be clearly understeered.

German Patent Document DE 198 30 561 C2 has, a vehicle handling control for preventing a swerving and/or cross-wind deviation movement of a vehicle and particularly a vehicle handling control device for controlling the brake system of a vehicle. In the case of this known system, a selected wheel or several selected wheels are braked in a controlled manner in order to counteract a rise of the deviation of the actual yaw velocity detected by way of a yaw velocity sensor from a desired yaw velocity estimated from the steering angle and the vehicle speed. The system intervenes when the deviation is greater than a certain control value. Prior art discloses a device for appropriate control of vehicle handling based on an improved estimation of the deviation of the actual yaw velocity detected by way of a yaw velocity sensor from the desired yaw velocity estimated from the steering angle and the vehicle speed.

The present invention of the lateral correction describes a system for improving driving dynamics, which can be used easily and rapidly, for a control strategy for the longitudinal clutch and/or the main-axle lateral lock in the case of all-wheel systems or also of the controllable lateral lock of vehicles with single axle drives.

According to the present invention, the dampering of the yawing motion is increased by influencing the torque distribution between the axles and/or the change of the locking value at the lateral lock. This results in the stabilization of the vehicle.

Advantageously, the required input quantities for the method according to the invention already exist in a vehicle based on modern technology, and the signals of the sensors or the information existing in the data bus only have to be read out by the control unit. Quantities already known in the vehicle are the yaw angle, the yaw angle velocity, the yaw angle acceleration or the lateral acceleration and the driving direction desired by the driver which is defined, for example, by the steering angle. Complicated additional calculations are not required because all these data are already present in the vehicle in a processed manner and only the corresponding data exchange has to take place.

It is another advantage that the control strategy according to the invention can be used in the case of an all-wheel drive with longitudinal clutches, in the case of an all-wheel drive with controllable hang-on systems, in the case of an all-wheel drive with a fixed distribution and a controllable longitudinal lock, in the case of an all-wheel drive with a controllable rear-axle lateral lock as well as in the case of single-axle driven vehicles with a controllable lateral lock.

In all these methods, the required clutch torque is a function of the driving speed, the driving direction desired by the driver and the actual driving direction change of the vehicle. The value for the locking torque resulting from these input quantities can be applied by way of several characteristic curves or characteristic diagrams and by means of separate variables for the longitudinal and lateral lock and can be correspondingly filed in the control unit. In this case, the application advantageously takes place in a manner which is individually adapted to the vehicle type and the motorization.

Finally, it is advantageous, according to the present invention, to provide a response threshold for the intervention of the control strategy. Here, a reference value can be defined which indicates the permissible deviation of the actual and the desired value.

Other objects, advantages and novel features of the present invention will become apparent form the following detailed description of the invention when considered in conjunction with the accompanying drawings.

BRIEF DESCRIPTION OF THE DRAWINGS

An embodiment of the control according to the invention is illustrated in the FIGURE and will be explained in detail in the following.

DETAILED DESCRIPTION OF THE PREFERRED EMBODIMENT

The figure shows a flow chart for implementing the method in a schematic overview. This means that only the significant process steps are illustrated in the figure without discussing additional influencing variables. As a result a clear and simple representation can be selected.

In a first operating step 10, the required input quantities of all sensors, which exist in the vehicle but are not shown here, for determining the yawing motion, the yaw acceleration, the yaw angle, the yaw angle acceleration or the lateral acceleration, the driving direction desired by the driver, the driving speed, and additional input quantities, which are required for detecting and determining the actual driving situation, are first detected. In a subsequent working step 11, the driving direction desired by the driver is determined from these input values, for example, on the basis of the steering angle LW, and in an operating step 12, the actual moving direction BR of the vehicle is determined. As illustrated here, these two steps may take place isochronously or successively. Subsequently, in operating step 13, a comparison of these two quantities—steering angle LW and moving direction BR—is implemented. During the comparison of the two values, a definable reference value RW is taken into account by which the two values—steering angle LW and moving direction BR—may deviate from one another. This takes place in operating step 13 in such a manner that first the difference of the steering angle LW and the moving direction BR is formed, and the amount of this difference (ILW−BRI) is compared with the reference value RW. If this amount of the difference is smaller than or equal to the definable permissible reference value RW, a proper driving situation is detected and the yes output of the operating step 13 skips to the end of this method to step 16, so that a new analysis takes place and the next input quantities are detected and analyzed. However, if the amount of the difference of the steering angle LW and the moving direction BR is greater than the definable reference value RW, the method detects that the vehicle is in an unstable oversteered range, and in operating step 14, a corresponding control of the longitudinal clutch takes place, so that the yaw damping is increased and thus the coupling between the front and rear axle is also increased. In the case of vehicles with a controllable rear-axle lateral lock, in addition or as an alternative to operating step 14, in operating step 15, the locking torque can be adapted. After this intervention has taken place, the output of operating step 14 and 15 also leads into the operating step 16 in which, in turn, the next operating situation is detected.

The required clutch torque is a function of the driving speed, the driving direction desired by the driver and the actual driving direction change of the vehicle. Additional parameters may also be included in the determination.

The value for the locking torque can be applied by way of several characteristic curves and characteristic diagrams and variables separately for the longitudinal and lateral lock. As a rule, the application is individually adapted to the vehicle type and the motorization. Depending on the design of the chassis adaptation, a different adapting of the function of the coasting and drive operation is conceivable.

The determination of a response threshold, which is indicated by the reference value, for the described control has the advantage of preventing implausible controls in the range around zero.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of regulating handling of a vehicle having controllable longitudinal clutch and optionally a controllable main-axle lateral lock, comprising the steps of:

detecting and processing vehicle sensed input quantities;

comparing a desired drawing direction defined by a steering angle with an actual moving direction of the vehicle; and if values of said desired direction and said actual moving direction deviate from one another by a definable reference value, increasing coupling between a front axle and a rear axle of the vehicle in order to increase the yaw damping and, when said controllable main-axle lateral lock is present, the locking torque of the main-axle lateral lock.

2. The method according to claim 1, wherein the defineable reference value is determined in a vehicle-specific or engine-specific manner.

3. The method according to claim 1, wherein a value for the locking torque is stored in characteristic diagrams.

4. The method according to claim 1, wherein clutch torque between a front axle and a rear axle is a function of the driving speed, the driving direction desired by a driver and a change in the actual moving direction of the vehicle.

5. The method according to claim 1, wherein the locking torque and the yaw damping are increased simultaneously.

6. A method of regulating handling of a vehicle, comprising the steps of:

detecting and processing a plurality of vehicle driving parameters, including a driver desired driving direction value;

comparing said desired direction value with a value of an actual moving direction value obtained from said processed plurality of vehicle driving parameters and outputting a comparison value at least one of increasing coupling between a front and a rear axle of the vehicle and increasing locking torque of a main axle lateral lock of the vehicle in order to increase yaw damping, when said comparison value exceeds a defineable reference value.

7. The method according to claim 6, wherein the defineable value is determined in a vehicle-specific or engine-specific manner.

8. The method according to claim 6, wherein a value for the locking torque is stored in characteristic diagrams.

9. The method according to claim 6, wherein clutch torque between a front axle and a rear axle is a function of the driving speed, the driving direction desired by the driver and a change in the actual measuring direction of the vehicle.

10. The method according to claim 6, wherein the locking torque and the yaw damping are increased simultaneously.

* * * * *